United States Patent Office 2,780,562
Patented Feb. 5, 1957

2,780,562
PROCESS OF DECORATING TEXTILE MATERIALS

Kurt Reinartz, Wilhelm Graulich, and Wolfgang Lehmann, Leverkusen, and Helmut Kleiner, Opladen, Germany, assignors to Farbenfabriken Bayer Aktiengesellschaft, Leverkusen, Germany, a corporation of Germany No Drawing. Application October 29, 1951, Serial No. 253,762

Claims priority, application Germany October 30, 1950

17 Claims. (Cl. 117—63)

It has already been proposed to employ as binders for the decorating of textile materials according to the pigment printing process polymer latices which contain polyvinyl compounds like polyvinyl acetate, methyl-methacrylate or ethyl-methacrylate or their interpolymers, or to employ combinations of polyvinyl compounds with thermosetting resins. Especially suitable for this purpose are the emulsions of interpolymers described in the co-pending application Serial No. 226,526, filed May 15, 1951, by Wilhelm Graulich, Benno Becht, Wilhelm Becker and Heinrich Siebert. The prints obtained with these latices on cotton satisfy the requirements as regards fastness to rubbing and washing. Difficulties, however, are encountered in the printing of textile materials from regenerated cellulose.

Another process for the printing and decorating of textiles with pigment dyestuffs employs as binders water-soluble salts of compounds containing amino-or imino-groups which are later reacted with polyfunctional compounds and thus insolubilized during the printing. A process of this kind is described in the co-pending application Ser. No. 117,262 filed September 22, 1949, by Helmut Kleiner, Otto Bayer and Benno Becht, now Patent No. 2,643,958 and Ser. No. 238,403.

We have now found that it is possible to decorate textile materials, including rayon staple and to obtain prints of extremely good fastness to rubbing and washing by applying to said textile materials polymer emulsions together with highly molecular basic compounds which are easily soluble in water or at least can easily be emulsified in the form of their salts, and reacting them with compounds which contain two or more reactive groups, if necessary in the heat.

According to the invention we know polymers may be employed in the polymer emulsion. We refer to the polymers of vinyl acetate, methyl acrylate and their interpolymers, further the polymers of vinyl pyrrolidone, vinyl pyridine, vinyl methyl ether and their interpolymers which are employed according to the process of the aforesaid co-pending application Ser. No. 226,526, for instance, the interpolymers from methyl-methacrylate, butyl-acrylate, vinyl chloride and vinylidene chloride on the one hand and from acrylonitrile or butadiene and its derivatives, chlorobutadiene or diethylene-glycoldiacrylate on the other hand. Instead of or in combination with these polymers, interpolymers may be employed which contain reactive groups, for instance polyvinyl alcohol, polyacrylic amides and polyacrylic acids.

Basic polymers which according to the invention are suitable to be combined with the above named polymer latices are those which are soluble or emulsifiable at least in the form of their salts and which are described in the aforesaid co-pending application Ser. No. 117,262 and in the co-pending application Ser. No. 238,403 filed July 24, 1951, by Wolfgang Lehmann and Heinrich Rinke.

Especially suitable are basic polyureas, basic polyamides, especially polyoxamides, basic polyesters, basic polyurethanes, in short polymers which contain primary or secondary basic nitrogen in the chain or in the side-chain.

Examples are, for instance, polyureas from diisocyanates and diprimary amines with one or several secondary or tertiary nitrogen atoms in the chain, polyamides from diprimary amines with one or several secondary or tertiary nitrogen atoms in the chain and dicarboxylic acids, polyoxamides from diprimary amines with one or several nitrogen atoms in the chain and oxalates, basic polyesters obtained by reacting polymers and ester groups with di- or polyamines, polyesters obtained by polycondensation of diols with one or several secondary or tertiary nitrogen atoms and dicarboxylic acids, or obtainable from polyester-isocyanates by reaction with di- or polyamines, polyurethanes from diols with one or several nitrogen atoms in the chain and diisocyanates, or from diprimary amines with one or several nitrogen atoms in the chain and glycol-bis-chloro-carbonates.

Apart from the polymers containing basic nitrogen, other macromolecular compounds containing amino- or imino-groups may be employed, for instance basic polystyrene, basic acrylonitrile polymers etc.

The basic groups may be introduced in various ways, for instance interpolymeric modifications may be subsequently reacted with di- or polyamines in such a manner that the final product contains basic groups. As an example of the numerous possibilities we mention the interpolymerisation of styrene and acrylfluoride and the subsequent reaction of the interpolymer obtained with N-methyl-propylene-diamine.

Polyacrylates or polyacrylamides may be charged with basic groups by aminolyzing with di- or polyamines.

Furthermore, polymers which contain groups capable of reduction or hydrogenation, for instance nitro- or nitrilo groups may be converted into basic polymers by the action of nascent or catalytically activated hydrogen.

Furthermore, polyacrylonitrile can be converted into basic derivatives by the action of boiling polyamines, for instance ethlene diamine.

Polyvinylamines may be obtained by saponification of polymeric vinyl succinimide or vinyl phthalimide by means of hydrazine hydrate, preferably according to Reynolds (J. Am. Chem. Soc. 69/4, p. 911).

Basic polyesters may be obtained from isocyanate modified polyesters by reaction with di- or polyamines or by reaction of acrylochloride or chloroacetylchloride upon polyesters containing hydroxyl groups and subsequent reaction with amines.

Furthermore, all those high molecular compounds are suitable for the process of the invention in which halogen atoms may be exchanged for amino groups, for instance, in chlorinated polyisobutylenes, chlorinated paraffin hydrocarbons containing about 12–20 carbon atoms.

A further class of compounds which may be employed according to the present invention are the polyimines, i. e. compounds which contain imino groups in their chain and which are accessible in various manners, for instance, by polymerisation of ethylene imine or by condensation of ethylene chloride with ammonia.

Long chain compounds containing imino groups may also be obtained by cross-linking high molecular polyamines, for instance, such as are obtained by the stepwise addition of bifunctional amines to acrylonitrile and subsequent hydrogenation. These compounds may be linked to yield long chain compounds by reaction with diisocyanates, acid chlorides, diacrylamides, etc. For instance, hexamethylene diamine is added to acrylonitrile on both sides, hydrogenated and the addition product to a further acrylonitrile molecule and subsequent hydrogenation is repeated several times until the desired end product is obtained:

H₂N—(CH₂)₃—[NH(CH₂)₃]₄—NH(CH₂)₆—
  NH—[(CH₂)₃—NH]₄—(CH₂)₃—NH₂

This polybasic compound may be prolonged at the terminal amino groups by bifunctional compounds, for instance, by oxalyl chloride, phosgene, diisocyanates or diacrylamides, the terminal —NH₂-group being added to the acryl double bond.

Basic polymers which are suitable according to the present invention may also be obtained by reaction of polybasic compounds like Spermin (ω,ω'-diamino-dipropyl-diaminobutane to hexahydro-1.3.5-triacrylyl-s-triazine in a proportion of 3:1.

Furthermore, the following compounds may be employed as basic compounds: basic polysaccharides, for instance so-called amine cellulose, amine starch, the addition products of ethylene amine and hydroxy ethyl cellulose or polyvinyl alcohol, hydrolysates of protein substances, for instance hydrolysates from glue, casein of gelatin and aminolysates with polyamines.

As compounds containing two or more reactive groups and being capable of converting the above polymeric compounds or condensation products into cross-linked, insoluble products may be mentioned: the trimeric addition compound obtainable from formaldehyde and acrylonitrile, i. e. hexahydro - 1.3.5 - triacrylyl - s - triazine (see Ballauf and Wegler, Chem. Ber. 81 (1948), p. 527 et seq.) furthermore acrylic amides of polyvalent amines, such as ethylene diamine, or acrylic acid esters of polyvalent alcohols, such as ethylene glycol, glycerol, or polyesters of a polyvalent unsaturated acid, such as maleic acid, and polyvalent alcohols.

As polyfunctional cross-linking agents all compounds may be employed which contain two or more radicals capable of reacting with primary or secondary amino groups. Suitable compounds are for instance the so-called "polyisocyanate formers." The term "polyisocyanate formers" as used herein shall comprise compounds reacting like polyfunctional isocyanates at elevated temperature (cf. French Patent No. 876,285). As examples may be named the addition products of 1 mol of a diisocyanate and 2 mols of a 1,3-diketone or 1,3-ketone ester, like acetic acid ester or malonic acid esters. Especially well suited are the addition products of bisulfite and polyfunctional isocyanates which possess the advantage of being water soluble. Further cross-linking agents are polyfunctional acids like adipic acid or condensation products of phenoxyacetic acid with formaldehyde. Instead of the acids, polyfunctional esters of low molecular weight as well as polymeric products may be employed. Examples for the first class of compounds are methane-tricarboxylic acid-triphenylester and N-cyano-imino-dicarboxylic - acid - diphenylester. Examples for the second class of compounds are polyacryl acetic esters and their derivatives. Furthermore, polyfunctional aldehydes may be mentioned, such a glyoxal, chloromalonic-dialdehyde. Cross-linking agents which contain several reactive double bonds to which basic imino or amino groups may be added, are also suitable according to the invention. Furthermore, formaldehyde and its various polymeric modifications or compounds yielding formaldehyde, for instance Rongalite, are also within the scope of the invention, the latter being especially active during the steaming in neutral or weakly alkaline medium.

The addition of cross-linking agents is not always necessary according to the invention. In some cases, insoluble prints are also obtained by employing soluble or fusible compounds which are capable of cross-linking owing to the fact that they contain in their molecule simultaneously basic primary or secondary salt forming amino groups and groups capable of reacting with the amino groups.

Such groups are for instance carboxyl groups, carbonamide groups, hydroxyl groups, sulfamide groups, or isocyanate groups, for instance in the form of addition products of 1,3-diketone and bisulfite which are split off in the heat, furthermore groups containing reactive double bonds, for instance acrylic acid, maleic acid, and/or nitrilo groups, furthermore aldehyde groups or halogen atoms.

The above groups may be either attached to the side chains of the basic polymers, or they may be components of the main chain, such as for instance the carboxylic ester group in polyesters, the carbonamide group in polyamides, polyureas or polyurethanes. In these cases, chains are split up and linked again in the intermolecular cross-linking reaction.

The above described cross-linking groups may be introduced into the polymeric products in two different ways. They may already be present in the starting materials employed for the production of the polymers or condensation products, or they may be subsequently introduced or also subsequently set free if they are present in a latent state. Examples for the first type are polymers of vinyl compounds containing ester, carbonamide, carboxylic acid, or nitrilo groups (for instance acrylic acid or its derivatives or copolymers with these compounds. The ester or amide groups may also be formed in the production of condensation polymers like polyesters or polyamides, or groups capable of reacting with amino groups are introduced by condensation, for instance maleic anhydride or maleates. As examples for the subsequent production of groups reacting with amino groups may be mentioned for instance the subsequent chlorination or bromination (either before introducing the amino groups or by carefully setting free the amino groups already present), furthermore saponification of nitrilo groups and the like.

Suitable thickeners for the purposes of pigment printing are the known thickening agents, such as methyl cellulose, locust bean flour, British gum, tragacanth, or oil emulsions. The formulation of the printing paste is carried out for instance by intimately mixing the emulsions or solutions of the binder with the solution of the thickener and then stirring the pigment dyestuff into the resulting paste. The paste can be diluted with water.

As acids for the neutralization of the basic film formers are especially suited volatile or weak acids, which evaporate during drying or easily hydrolize on heating, thus setting free the polyamine for the cross-linking reaction. However, if the prints are anyhow subjected to an after-treatment with alkalies, for instance if vat dyestuffs or coupling dyestuffs are employed in the pigment printing, non-volatile or stronger acids may also be used, which are neutralized by the alkali applied.

The main advantage which is achieved by the combination of polymeric latices with water soluble basic polymers and the after-treatment with reactive vinyl compounds according to this invention, consists in the excellent properties of the prints obtained on textile materials. For instance, the present process yields prints, either by steaming or by heating which are substantially faster to rubbing than the prints obtained by cross-linking the basic polymers without the addition of latex. Furthermore, the shades of the prints obtained according to the new process are essentially deeper, clearer and brighter than the color of the prints produced by means of the individual components, and the new prints, as regards fastness to washing are distinctly superior to those obtained by previously known methods. This applies especially to the printing of textiles from regenerated cellulose. Furthermore, the prints obtained according to the invention show a softer feel.

Furthermore, the present invention allows of producing resist prints showing a distinctly sharper and clearer resist effect than could be achieved up to the present.

Apart from the possibility of employing a great variety of starting materials as cross-linking polymers or condensation products, the advantage of the invention consists in its simplicity and safety of application, since volatile and inflammable solvents are unnecessary.

The process of the present invention may be employed for the printing of textiles or other fibrous material like paper. In the latter case, advantages are obtained in the printing of wallpaper, since wallpaper is obtained which is fast to rubbing even in the wet state.

The present invention is further illustrated by the following examples without being restricted thereto, parts being by weight.

Example 1

A copolymer latex from 70 parts of vinylidenechloride and 30 parts of butyl acrylate is prepared by polymerization of 100 parts of the mixture of monomers in 150 parts of a 5% aqueous solution of the sodium salt of sulfonated long chain paraffin hydrocarbons with the addition of 2 parts by volume of $n/1H_2SO_4$ and 0.6 part of the sodium salt of paraffin sulfinic acids at 20° C. in the autoclave until the mixture of monomers has completely reacted. After 15 hours a latex of a polymer content of 39.5 percent is obtained.

Formulation of the printing paste is carried out by mixing 200 parts of this latex with
  75 parts of a 20 percent aqueous solution of benzyl-p-hydroxy-diphenyl-polyglycol ether and
200 parts of a 10 percent aqueous solution of the acetate of a basic polyurea prepared from 0.2 mol of diethylene triamine, 0.8 mol of $\gamma,\gamma'$-diamino dipropyl methyl amine and 1.0 mol of hexane diisocyanate. The mixture is homogenized by stirring.

To the mixture are added:
100 parts of methyl cellulose (70:1000)
150 parts of a 20 percent blue copper phthalocyanine pigment dyestuff paste
  15 parts of hexahydro-1.3.5-triacrylyl-s-triazine
   5 parts of paraffin sulfonyl amide
255 parts of water
_____
1000 parts In the above printing paste the hexahydro-1.3.5-triacrylyl-s-triazine may be replaced by the addition product of hexane-diisocyanate and potassium bisulfite.

The mixture yields a stable printing paste of good furnishing properties, which is easily rinsed from the printing rollers or film printing screens with water. The paste is printed on cotton or on rayon staple as usual. The prints obtained are after-treated by pre-drying in a drying loft at 40–70° C. and subsequent dry-heating prints on cotton at 100–110° C. and prints on rayon staple or rayon at 110–130° C.

Instead of heating, the printed goods can be steamed in neutral or acid medium or passed through an alkaline bath containing per liter 2–3 grams of NaOH 38° Bé. at 50–80° C. The prints obtained on cotton, rayon staple or rayon are distinguished by excellent depth of color, clearness, fastness to rubbing even in the wet state, excellent fastness to washing, excellent fastness to boiling soda and light.

Example 2

By polymerization of a mixture of 25 parts of acrylonitrile, 40 parts of vinylidenechloride and 35 parts of butyl acrylate according to Example 1 a latex with a polymer content of 38–40% is obtained.

200 parts of this latex are mixed with
  75 parts of a 20 percent aqueous solution of benzyl-p-hydroxy-diphenyl-polyglycol ether and
200 parts of a 20 percent aqueous solution of the acetate of a basic polyurea ($z\eta$/viscosity number/$=122$), consisting of 1.0 mol of hexane-diisocyanate and 1.0 mol of $\gamma,\gamma'$-diamino dipropyl methyl amine.

The mixture is homogenized by stirring.
To the above mixture are added:
  50 parts of glycerol
  80 parts of methyl cellulose
150 parts of a 20 percent red pigment dyestuff paste
  15 parts of hexahydro-1.3.5-triacrylyl-s-tirazine
   5 parts of paraffin sulfonyl amide
225 parts of water
_____
1000 parts The prints obtained by means of the above printing paste show similar properties as those obtained according to Example 1. They have an especially soft feel.

Example 3

By polymerizing a mixture consisting of 50 parts of butyl acrylate and 50 parts of vinylidenechloride a latex of a polymer content of 38–40 percent is obtained as in Example 1.

200 parts of this latex are mixed with
  75 parts of a 20 percent aqueous solution of benzyl-p-hydroxy diphenyl polyglycol ether and
100 parts of a gasoline which is poor in aromatic substances (B. P. 100–148° C.) are added thereto. Thereupon
200 parts of a 10 percent aqueous solution of the acetate of the basic polyurea used in Example 1 are added. The mixture is homogenized by stirring.

To this mixture are added:
  50 parts of glycerol
  70 parts of methyl cellulose (70:1000)
  20 parts of a 20 percent yellow pigment dyestuff paste
  15 parts of hexahydro-1.3.5-triacrylyl-s-triazine
   5 parts of paraffin sulfonyl amide
265 parts of water
_____
1000 parts The prints obtained by means of the above printing paste have the same properties as those described in Examples 1 and 2.

Example 4

By polymerizing a mixture consisting of 20 parts of butyl acrylate, 20 parts of vinylidenechloride and 60 parts of vinyl chloride as in Example 1, a latex of a polymer content of 38–40 percent is obtained.

200 parts of this latex are mixed with
  75 parts of a 20 percent aqueous solution of benzyl-p-hydroxy-diphenyl propyl glycol ether and
100 parts of turpentine are introduced with stirring. Thereupon
200 parts of a 10 percent aqueous solution of the acetate of a basic thiourea ($z\eta=225$) prepared from 1.0 mol of $\gamma,\gamma'$-diamino dipropyl methyl amine and 1.0 mol of hexane-diisocyanate are added. The mixture is homogenized with stirring.

To this mixture are added:
  50 parts of glycerol
  60 parts of methyl cellulose
200 parts of a 20 percent green pigment dyestuff paste
  15 parts of hexahydro-1.3.5-triacrylyl-s-triazine
  30 parts of acetic acid (50%)
  70 parts of water
_____
1000 parts The prints obtained by means of the above printing paste have the same properties as those described in Examples 1–3.

Example 5

200 parts of the latex described in Example 1 are mixed with 75 parts of a 20 percent aqueous solution of benzyl-p-hydroxy-diphenyl polyglycol ether and
100 parts of gasoline of the B. P. 100-140° C. (poor in aromatic substances) are added with stirring. Thereupon
200 parts of a 30 percent aqueous solution of the acetate of a basic polyamide prepared by condensation from 1.0 mol of a mixture of undecane- and dodecane-dicarboxylic acids and 1.0 mol of $\gamma,\gamma'$-diamino-dipropyl-methyl-amine. The mixture is homogenized by stirring.

To this mixture are added:
50 parts of glycerol
50 parts of an emulsion of gasoline in water
15 parts of hexahydro-1.3.5-triacrylyl-s-triazine
200 parts of a 20 percent red pigment dyestuff paste
5 parts of paraffin sulfonyl amide
105 parts of water 1000 parts The prints obtained by means of the above printing paste have the same properties as those described in Examples 1-4.

*Example 6*

200 parts of the latex described in Example 1 are mixed with
75 parts of a 20 percent aqueous solution of benzyl-p-hydroxydiphenyl-polyglycol-ether and
200 parts of the 40 percent aqueous solution of the acetate of the reaction product of butyl polyacrylate and methyl propylene diamine (basic nitrogen=1.6% calculated on the polymer content) are added and the mixture is homogenized by stirring.

To the mixture are added:
50 parts of glycerol
305 parts of methyl cellulose (70:1000)
150 parts of a 15 percent aqueous paste of copper phthalocyanine
15 parts of hexahydro-1.3.5-triacrylyl-s-triazine
5 parts of paraffine sulfonylamide 1000 parts This paste yields prints on cotton, rayon staple and rayon which—compared with prints obtained with a paste containing no latex—are distinguished by their depth of color and brightness of shade, good fastness to rubbing in the dry and wet state and improved fastness to washing on rayon staple and rayon.

*Example 7*

200 parts of the latex obtained according to Example 2 are mixed with
75 parts of a 20 percent aqueous solution of benzyl-hydroxydiphenyl-polyglycol-ether and
200 parts of a 10 percent aqueous solution of the acetate of the basic polyurea employed in Example 1, are added and the mixture is homogenized by stirring.

Thereupon are added:
50 parts of glycerol
100 parts of methyl cellulose (70:1000)
15 parts of hexahydro-1.3.5-triacrylyl-s-triazine
100 parts of a 15 percent aqueous paste of copper phthalocyanine
120 parts of 80 percent lactic acid
135 parts of water
5 parts of paraffin sulfonylamide 1000 parts This paste is printed upon naphtholated goods which are dried in a drying loft at 70° C. and dyed with Variamine Blue Salt. The goods are subsequently given a short air passage, passed through a hot bath containing bisulfite, rinsed, entered into a second bath of a temperature of 80° C. containing per liter 2-3 grams of sodium hydroxide of 38° Bé., and rinsed. Finishing is carried out in a boiling soap solution as is common practice with Variamine Blue goods. Very bright resist effects of sharp outlines, of good fastness to light and excellent fastness to rubbing and boiling soda are obtained.

*Example 8*

200 parts of the latex obtained according to Example 2 are mixed with
75 parts of a 20 percent aqueous solution of benzyl-p-hydroxydiphenyl-polyglycol-ether and
200 parts of a 10 percent aqueous solution of the acetate of the basic polyurea employed in Example 1 are added. The mixture is homogenized by stirring.

Thereupon are added:
50 parts of glycerol
80 parts of methyl cellulose (70:1000)
15 parts of hexahydro-1.3.5-triacrylyl-s-triazine
200 parts of a 20 percent aqueous pigment dyestuff paste
90 parts of tartaric acid (100 percent)
85 parts of water
5 parts of paraffine sulfonylamide 1000 parts This printing paste is applied to naphtholated textiles and the goods are dried in a drying loft at about 70° C. and dyed with a solution of a dyeing salt. After passing a cold bath containing per liter 2-3 grams of hydrochloric acid of 20° Bé. and rinsing, the goods are passed through an alkaline bath containing per liter 2-3 grams of sodium hydroxide of 38° Bé. at about 80° C. Finishing is carried out in a boiling soap solution.

The paste yields very bright resist effects of distinct outlines and excellent fastness to rubbing, to light and to boiling soda on textiles dyed with ice colors.

*Example 9*

200 parts of the latex obtained according to Example 1 are mixed with
150 parts of a 20 percent aqueous solution of benzyl-p-hydroxydiphenyl-polyglycol-ether
200 parts of a 10 percent aqueous solution of the acetate of the basic polyurear employed in Example 1 are added. The mixture is homogenized by stirring.

Thereupon are added:
50 parts of glycerol
20 parts of methylcellulose (70:1000)
15 parts of hexahydro-1.3.5-triacrylyl-s-triazine
200 parts of a 20 percent aqueous green pigment dyestuff paste
100 parts zinc oxide
60 parts of water
5 parts of paraffine sufonylamide 1000 parts For producing first printed resists the paste is applied to white goods which are dried in a drying loft at about 70° C. and slop-padded with an Aniline Black padding solution. After drying the goods are steamed for developing the Aniline Black and simultaneously fixing the pigment. Finishing is carried out as usual.

*Example 10*

200 parts of the latex obtained according to Example 3 are mixed with
75 parts of a 20 percent aqueous solution of benzyl-p-hydroxy-diphenyl-polyglycol-ether and thereupon 100 parts of a 10 percent aqueous solution of the acetate of a basic polyoxamide ($z\eta=245$) prepared from Spermine $$H_2N.(CH_2)_3.NH(CH_2)_4.NH.(CH_2)_3.NH_2$$

and ethyl oxalate. The mixture is homogenized by stirring.

Thereupon are added:
50 parts of glycerol
40 parts of methyl cellulose (70:1000)
200 parts of a 20 percent aqueous red pigment dyestuff paste
15 parts of hexahydro - 1.3.5 - triacrylyl-s-triazine
320 parts of water
___
1000 parts This printing paste gives prints the properties of which are equal to those of the prints produced according to Examples 1–3.

*Example 11*

200 parts of the latex obtained according to Example 1 are mixed with
75 parts of a 20 percent aqueous solution of the benzyl-p-hydroxy-diphenyl-polyglycol-ether and
200 parts of a 10 percent aqueous solution of the acetate of a basic polyurea ($z\eta=270$) prepared from 0.05 mol of diethylene triamine, 0.95 mol of $\gamma,\gamma'$-diaminodipropylmethylamine and 1.00 mol of hexane diisocyanate. The mixture is homogenized by stirring.

Thereupon are added:
50 parts of glycerol
15 parts of formaldehyde (30 percent)
200 parts of a red, aqueous pigment dyestuff paste
30 parts of acetic acid (50 percent)
230 parts of water
___
1000 parts This paste is applied to textiles as described in Example 1. The resulting prints show the same properties as the prints of Examples 1–3.

*Example 12*

200 parts of the latex obtainable according to Example 2 are mixed with
75 parts of a 20 percent aqueous solution of benzyl-p-hydroxydiphenyl-polyglycol-ether and
200 parts of a basic polyester from 13 mols of adipic acid and 4 mols of trimethylol propane, acrylochloride and subsequent addition of butylamine to the acryl double bonds (60 percent strength, basic nitrogen=4.8 percent calculated on the polymer content). The mixture is homogenized by stirring.

Thereupon are added:
50 parts of glycerol
150 parts of methyl cellulose (70:1000)
30 parts of hexahydro-1.3.5-triacrylyl-s-triazine
200 parts of an aqueous red pigment dyestuff paste
95 parts of water
___
1000 parts The stability of the printing paste and the ease with which it can be rinsed off the printing plates equal that of Example 1. Printing is carried through as in Example 1.

This paste yields prints on cotton, rayon staple and rayon which are distinguished by their depth of color and brightness of shade, good fastness to rubbing in the dry and wet state and excellent fastness to washing.

*Example 13*

200 parts of the latex prepared according to Example 1 are mixed with a 20 percent aqueous solution of
75 parts of benzyl-p-hydroxydiphenyl-polyglycol-ether and
400 parts of a 20 percent aqueous solution of the reaction product of butyl polyacrylate of the value 60 and methyl-propylene diamine (basic nitrogen=5.3% calculated on the polymer content) in acetic acid solution. The mixture is homogenized by stirring.

Thereupon are added:
50 parts of glycerol
45 parts of methyl cellulose (70:1000)
30 parts of hexahydro-1.3.5-triacrylyl-s-triazine
200 parts of a red aqueous pigment dyestuff paste
___
1000 parts The stability of printing paste and the ease with which it can be rinsed off the printing plates equal that of Example 1. Printing is carried through as in Example 1.

The paste yields prints on cotton, rayon staple and rayon, which are distinguished by their depth of color, brilliancy of shade, good fastness to rubbing in the dry and wet state and fastness to washing.

*Example 14*

200 parts of the latex prepared according to Example 1 are mixed with
75 parts of benzyl-p-hydroxydiphenyl-polyglycol-ether in a 20 percent aqueous solution and added to
200 parts of a 10 percent aqueous solution of polyethyleneimine-acetate. The mixture is homogenized by stirring.

Thereupon are added:
50 parts of glycerol
150 parts of methyl cellulose (70:1000)
15 parts of hexahydro-1.3.5-triacrylyl-s-triazine
150 parts of an aqueous red pigment dyestuff paste
160 parts of water
___
1000 parts Instead of 15 parts of hexahydro-1.3.5-triacrylyl-s-triazine also 65 parts of the addition product of potassium bisulfite and hexane-diisocyanate may be used with equal success.

The ease with which the printing paste can be rinsed from the printing plate is equal to that of Example 1. Printing is carried out as in Example 1.

The paste yields prints on cotton, rayon staple and rayon which are distinguished by their depth of color and brilliancy of shade, excellent fastness to rubbing in the dry and wet state and excellent fastness to washing.

*Example 15*

200 parts of the latex obtained according to Example 1 are mixed with
75 parts of benzyl - p - hydroxydiphenyl - polyglycol-ether in a 20 percent aqueous solution and added to
200 parts of a reaction product of acrylonitrile and ethylene diamine in a 40 percent acetic acid solution (basic nitrogen=10 percent calculated on the polymer content). This mixture is homogenized by stirring.

Thereupon are added:
50 parts of glycerol
150 parts of methyl cellulose (70:1000)
200 parts of an aqueous red pigment dyestuff paste
79 parts of water
46 parts of hexahydro-1.3.5-triacrylyl-s-triazine
___
1000 parts The ease with which the printing paste can be rinsed from the printing plate is equal to that of Example 1. Printing is carried out as in Example 1.

The paste yields prints on cotton, rayon staple and rayon that are distinguished by good fastness to rubbing in the dry and wet state and good fastness to washing.

*Example 16*

200 parts of the latex obtained according to Example 2 are mixed with
75 parts of a 20 percent aqueous solution of benzyl-p-hydroxydiphenyl-polyglycol-ether and added to
300 parts of the basic polystyrene prepared by reacting the copolymer of styrene and acrylo-fluoride with methyl propylene diamine in a 10 percent acetic acid solution. The mixture is homogenized by stirring.
Thereupon are added:
50 parts of glycerol
150 parts of methyl cellulose (70:1000)
15 parts of hexahydro-1.3.5-triacrylyl-s-triazine
200 parts of an aqueous red dyestuff pigment paste
10 parts of water 1000 parts The ease with which the printing paste can be rinsed from the printing plate is equal to that of Example 1. Printing is carried out as in Example 1.

The paste yields prints on cotton, rayon staple and rayon which are distinguished by their depth of color and brightness of shade, excellent fastness to rubbing in the dry and wet state, and good fastness to washing.

*Example 17*

200 parts of the latex obtained according to Example 2 are mixed with
75 parts of benzyl-p-hydroxydiphenyl-polyglycol-ether and
400 parts of an aqueous 10 percent solution of the acetate of a basic polyurea ($z\eta=240$) prepared from 0.2 mol of diethylene triamine, 0.8 mol of 8.8-diaminodipropylmethylamine and 1.0 mol of hexane diisocyanate.
Thereupon are added:
50 parts of glycerol
30 parts of methyl cellulose (70:1000)
200 parts of a red aqueous dyestuff pigment paste
45 parts of water 1000 parts The paste yields prints on cotton, rayon staple and rayon which are distinguished by their depth of color, brilliancy of shade, good fastness to rubbing, excellent fastness to washing, to light, and to boiling soda.

*Example 18*

100 parts of the latex prepared according to Example 1 are mixed with a 20 percent aqueous solution of
35 parts of benzyl-p-hydroxydiphenyl-polyglycol-ether.
Thereupon are added:
100 parts of a 10 percent aqueous solution of the acetate of the reaction product of butyl polyacrylate of the K-value 53 and methylpropylene diamine. The mixture is homogenized and made up with water to form 1000 parts by volume after addition of
50 parts of methyl cellulose (70:1000)
8 parts of hexahydro-1.3.5-triacrylyl-s-triazine.

After printing this paste on cotton or rayon staple or other textile fabrics, the printed goods are impregnated on the padding machine and intermediately dried at about 60° C. Fixation is carried out by passing the fabric through a dilute caustic soda solution (3 grams of soda per liter). The finish resist obtained is fast to washing and has a soft feel.

*Example 19*

100 parts of the latex prepared according to Example 1 are mixed with
35 parts of a 20 percent aqueous solution of benzyl-p-hydroxy-diphenyl-polyglycol-ether.
Thereupon are added:
100 parts of a 10 percent aqueous solution of the acetate of basic polyurea used in Example 1 and the mixture is homogenized by stirring. Then are added:
2 parts of methyl cellulose (70:1000)
8 parts of hexahydro-1.3.5-triacrylyl-s-triazine
10 parts of a 15 percent pigment dyestuff paste
100 parts of an emulsion of gasoline in water,
5 parts of paraffin sulfonylamide. The mixture is made up with water to form one liter.

This paste is printed on cotton, rayon staple or other textile fabrics and the goods are slop-padded on the padding machine. Fixation is carried out by passing the goods over drying cylinders or air-drying apparatus at 110° C. The printed goods may also be intermediately dried at 60° C. after slop-padding, and fixation may be carried out in a caustic soda solution containing alkali. The padded dyeings are distinguished by excellent fastness to rubbing and washing and a very soft feel.

*Example 20*

Casein fibers are swelled in warm water and subsequently immersed in a bath composed as follows:
50 parts of the latex prepared according to Example 1 are mixed with a 20 percent aqueous solution of
17.5 parts of benzyl-p-hydroxydiphenyl-polyglycol-ether.
Then are added:
50 parts of a 10 percent aqueous solution of the acetate of the reaction product of butyl polyacrylate of the K-value 53 and methyl-propylene diamine (basic nitrogen=7 percent calculated on the polymer content). The mixture is homogenized by stirring. At last
5 parts of hexahydro-1.3.5-triacrylyl-s-triazine in finely powdered form are introduced. The fabric is centrifuged until dry and fixation is achieved by heating. After this treatment the fabric exhibits a distinctly improved fastness to water and tear resistance when wet.

*Example 21*

An unsized paper foil is immersed in an emulsion consisting of
100 parts of the latex described in Example 1
35 parts of a 20 percent aqueous solution of benzyl-p-hydroxy-diphenyl-polyglycol-ether
100 parts of a 10 percent aqueous solution of the acetate described in Example 1
10 parts of hexahydro-1.3.5-triacrylyl-s-triazine
755 parts of water Then the foil is centrifuged and subsequently dried at 90° C. By this treatment the paper foil has become resistant to ink and no flushing occurs.

We claim:

1. A textile printing paste containing as a binder the mixture consisting essentially of an aqueous emulsion of addition polymers of polymerizable monomers, said monomers being selected from the group consisting of vinyl halides, vinylidene halides, acrylic acid esters of lower alkanols, methacrylic acid esters of lower alkanols, acrylonitrile, vinyl ethers, butadiene and mixtures thereof, with a compound selected from the group consisting of resinous polyamines and the salts of said polyamines with acids, said polyamines having recurring basic radicals selected from the group consisting of primary, secondary and tertiary aliphatic amino groups and being soluble in water at least in form of their salts, and an emulsifier.

2. A textile printing paste containing as a binder the mixture consisting essentially of an aqueous emulsion of addition polymers of polymerizable monomers, said monomers being selected from the group consisting of vinyl halides, vinylidene halides, acrylic acid esters of lower alkanols, methacrylic acid esters of lower alkanols, acrylonitrile, vinyl ethers, butadienes and mixtures thereof, with a compound selected from the group consisting of resinous polyamines and the salts of said polyamines with acids, said polyamines having recurring basic radicals selected from the group consisting of primary, secondary and tertiary apilhatic amino groups and being soluble in water at least in form of their salts, a pigment and an emulsifier.

3. A textile printing paste containing as a binder the mixture consisting essentially of an aqueous emulsion of addition polymers of polymerizable monomers, said monomers being selected from the group consisting of vinyl halides, vinylidene halides, acrylic acid esters of lower alkanols, methacrylic acid esters of lower alkanols, acrylonitrile, vinyl ethers, butadienes and mixtures thereof, with a compound selected from the group consisting of resinous polyamines and the salts of said polyamines with acids, said polyamines having recurring basic radicals selected from the group consisting of primary, secondary and tertiary aliphatic amino groups and being soluble in water at least in form of their salts, a pigment, a compound selected from the group consisting of formaldehyde, hexahydro-1,3,5-triacrylyl-s-triazine and the addition products of bisulfites and polyisocyanates, a thickening agent and an emulsifier.

4. A textile printing paste containing as a binder the mixture consisting essentially of an aqueous emulsion of addition polymers of polymerizable monomers, said monomers being selected from the group consisting of vinyl halides, vinylidene halides, acrylic acid esters of lower alkanols, methacrylic acid esters of lower alkanols, acrylonitrile, vinyl ethers, butadiene and mixtures thereof, with a salt formed from an acid and a resinous polyamine said polyamine having recurring basic radicals selected from the group consisting of primary, secondary and tertiary aliphatic amino groups and being soluble in water at least in form of its salts, a pigment, a compound selected from the group consisting of formaldehyde, hexahydro-1,3-5-triacrylyl-s-triazine and the addition products of bisulfites and polyisocyanates, a pigment, a thickening agent and an emulsifier.

5. A printing paste as claimed in claim 4 wherein the acid in the salt formed from an acid and a resinous polyamine is a volatile acid.

6. A textile printing paste containing as a binder the mixture consisting essentially of a copolymer of vinylidene chloride and butyl acrylate, the salt formed from an acid and a resinous polyurea having recurring basic aliphatic amino groups, hexahydro-1,3,5-triacrylyl-s-triazine, a pigment, a thickening agent and an emulsifier.

7. A textile printing paste containing as a binder the mixture consisting essentially of a copolymer of vinylidene chloride, butyl acrylate and acrylonitrile, the salt formed from an acid and a resinous polyurea having recurring basic aliphatic amino groups, hexahydro-1,3,5-triacrylyl-s-triazine, a pigment, a thickening agent and an emulsifier.

8. A textile printing paste containing as a binder the mixture consisting essentially of a copolymer of butyl acrylate, vinylidene chloride and vinyl chloride, the salt formed from an acid and a resinous polyurea having recurring basic aliphatic amino groups, hexahydro-1,3,5-triacrylyl-s-triazine, a pigment, a thickening agent and an emulsifier.

9. A textile printing paste containing as a binder the mixture consisting essentially of a copolymer of vinylidene chloride and butylacrylate, the salt formed from an acid and a polymer of an acrylic acid ester having recurring basic aliphatic amino groups, hexahydro-1,3,5-triacrylyl-s-triazine, a pigment, a thickening agent and an emulsifier.

10. Textile materials printed with a printing paste as claimed in claim 1.

11. Textile materials printed with a printing paste as claimed in claim 2.

12. Textile materials printed with a printing paste as claimed in claim 3.

13. The process of decorating textiles which comprises applying to the textiles an equeous printing paste as claimed in claim 1 and then rinsing said textiles in an aqueous solution of alkali.

14. The process of decorating textiles which comprises applying to the textiles an aqueous printing paste as claimed in claim 1 and then heating said textiles to a temperature up to about 100–150° C.

15. The process of decorating textiles which comprises applying to the textiles an aqueous printing paste as claimed in claim 3 and then rinsing said textiles in an aqueous solution of alkali.

16. The process of decorating textiles which comprises applying to the textiles an aqueous printing paste as claimed in claim 4 and then rinsing said textiles in an aqueous solution of alkali.

17. The process of decorating textiles which comprises applying to the textiles an aqueous printing paste as claimed in claim 5 and then heating said textiles to a temperature up to about 100–150° C.

References Cited in the file of this patent

UNITED STATES PATENTS

| | | |
|---|---|---|
| 2,511,113 | La Piana et al. | June 13, 1950 |
| 2,526,639 | Cupery | Oct. 24, 1950 |
| 2,536,050 | Fluck | Jan. 2, 1951 |
| 2,565,358 | Douglas | Aug. 21, 1951 |
| 2,643,958 | Kleiner et al. | June 30, 1953 |
| 2,678,924 | Graulich et al. | May 18, 1954 |

OTHER REFERENCES

Modern Plastics, October 1943, pages 112 and 148.